United States Patent [19]

Magyar et al.

[11] Patent Number: 6,019,430
[45] Date of Patent: Feb. 1, 2000

[54] RECLINER ASSEMBLY

[75] Inventors: Joseph J. Magyar, Fenton; William D. Wilstermann, Shelby Township, both of Mich.

[73] Assignee: Magna Lomason Corporation, Aurora, Canada

[21] Appl. No.: 09/169,052

[22] Filed: Oct. 9, 1998

Related U.S. Application Data

[60] Provisional application No. 60/061,528, Oct. 9, 1997.

[51] Int. Cl.⁷ ...................................................... B60N 2/22
[52] U.S. Cl. ............................................................ 297/367
[58] Field of Search ................................................ 297/367

[56] References Cited

U.S. PATENT DOCUMENTS

| | | |
|---|---|---|
| 3,953,069 | 4/1976 | Tamura et al. . |
| 4,103,970 | 8/1978 | Homier . |
| 4,146,267 | 3/1979 | Mori et al. ................................ 297/367 |
| 4,384,744 | 5/1983 | Barley . |
| 4,997,223 | 3/1991 | Croft . |
| 5,433,507 | 7/1995 | Chang . |
| 5,547,254 | 8/1996 | Hoshihara ................................ 297/367 |
| 5,588,705 | 12/1996 | Chang . |
| 5,692,589 | 12/1997 | Beguin . |
| 5,899,533 | 5/1999 | Tatematsu et al. ....................... 297/367 |

FOREIGN PATENT DOCUMENTS

| | | |
|---|---|---|
| 2364754 | 12/1973 | Germany . |
| 3521730 | 6/1985 | Germany . |
| 1046893 | 10/1996 | United Kingdom . |

*Primary Examiner*—Peter M. Cuomo
*Assistant Examiner*—David E. Allred
*Attorney, Agent, or Firm*—Howard & Howard

[57] ABSTRACT

A vehicle seat assembly comprising a seat back assembly pivotally coupled to a seat cushion assembly by a recliner assembly and pivotal between a plurality of reclined positions. The recliner assembly including a fixed plate secured to the seat cushion assembly and a seat back arm member secured to and movable with the seat back assembly. A locking mechanism including a pawl member and a locking control arm are coupled between the fixed plate and the seat back arm member and moveable between a locked position retaining the seat back cushion in a desired reclined position and an unlocked position allowing movement of the seat back cushion to any of the desired reclined positions. A seat back release member interconnects with each of the pawl member and the locking control arm to simultaneously move the locking mechanisms between the locked and unlocked position via a common pivot pin.

10 Claims, 9 Drawing Sheets

RECLINER ASSEMBLY

This application claims benefit of provisional application 60/061,528, filed Oct. 9, 1997.

TECHNICAL FIELD

The subject invention relates to a recliner assembly, and more specifically to a manually releasable locking recliner for a vehicle seat assembly.

BACKGROUND OF THE INVENTION

Vehicle seat assemblies typically include a generally vertical seat back assembly pivotally coupled to a generally horizontal seat cushion assembly by a recliner assembly for providing selective pivotal movement of the seat back assembly between a plurality of reclined positions. The recliner assembly commonly employs a plurality of camming lobes and interconnected locking member for selectively locking the seat back assembly in one of the reclined positions. U.S. Pat. No. 4,384,744 to Barley, issued May 24, 1983 exemplifies a vehicle seat reclining mechanism having a manual control member on a rotatable shaft for lifting a first toothed locking segment, or pawl, on the seat back frame out of contact with a second toothed locking segment, or rack, on the seat base to allow pivotal movement of the seat back frame to a reclined position. The first segment is lifted away from the second segment by a control arm, or cam, secured and rotatable with the shaft. The shaft, however, is not directly linked to the first toothed locking segment to further control the movement thereof with respect to the second toothed locking segment.

It remains desirable to provide a simplified recliner assembly having a manual release member interconnected to both the pawl and the control arm of the locking mechanism for movement between a locked and unlocked position with the seat back frame, thereby providing a common pivot and link between the release member and locking mechanism.

SUMMARY OF THE INVENTION

The subject invention is a recliner assembly comprising a fixed plate and a seat back arm member pivotally secured to the fixed plate for pivotal movement between a plurality of reclined positions. A locking mechanism selectively engages the seat back arm member between a locked position and an unlocked position. The locking mechanism including a pawl member moveable between the locked position engaging the seat back arm member and the unlocked position spaced from the seat back arm member and a locking control arm rotatably coupled between the seat back arm member and the fixed plate and operatively engageable with the pawl member between a first position forcing and retaining the pawl member in the locked position and a second position camming against the pawl member in the unlocked position. A seat back release member is pivotally coupled to the fixed plate and interconnected with each of the pawl member and the locking control arm for rotating the control arm between the first and second positions while simultaneously pivoting the pawl member between the locked and unlocked positions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
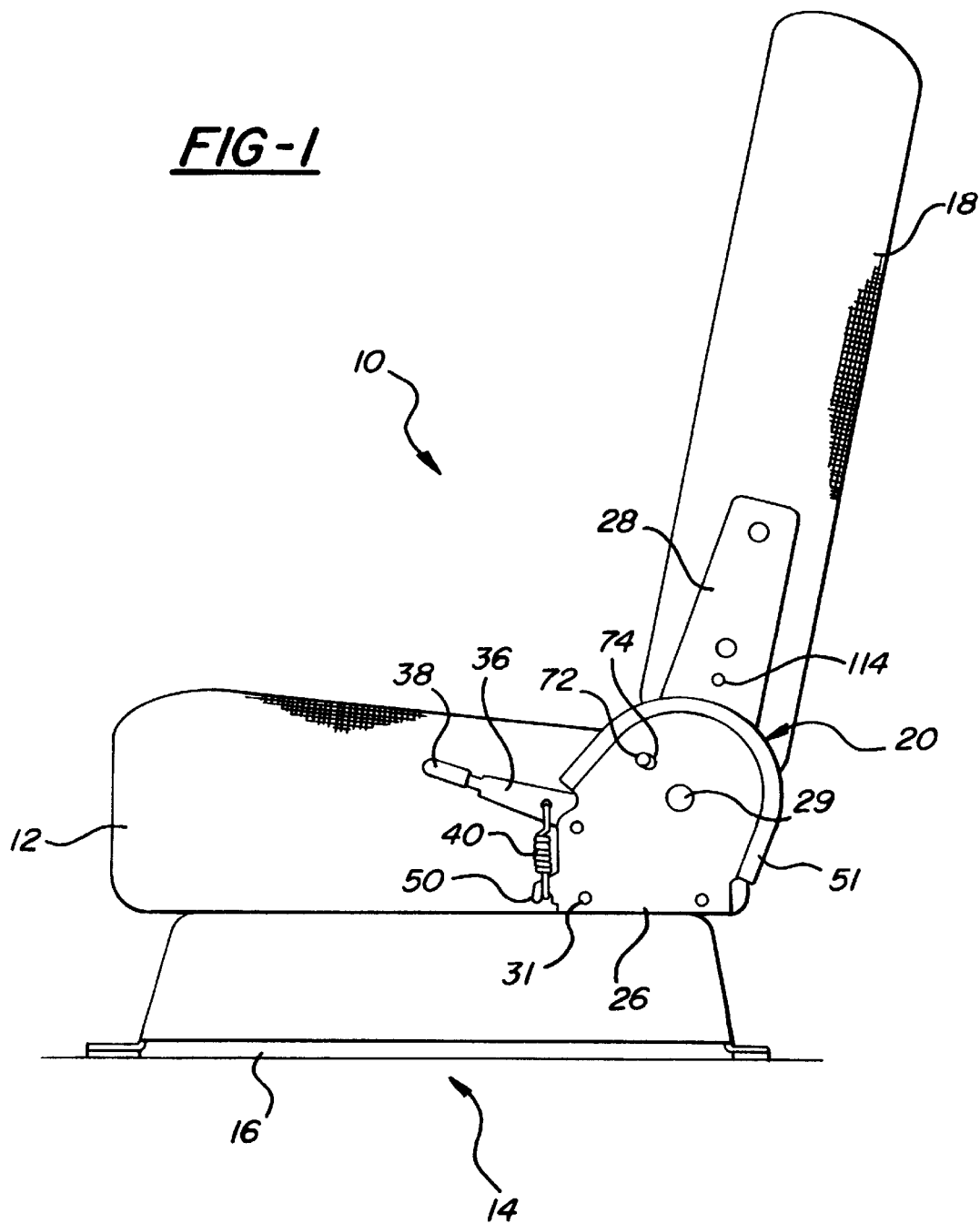
FIG. 1 of the drawings illustrates an embodiment of the present invention showing an elevated side view of a vehicle with an arrangement of an automotive seat back recliner assembly.
Figure 2:
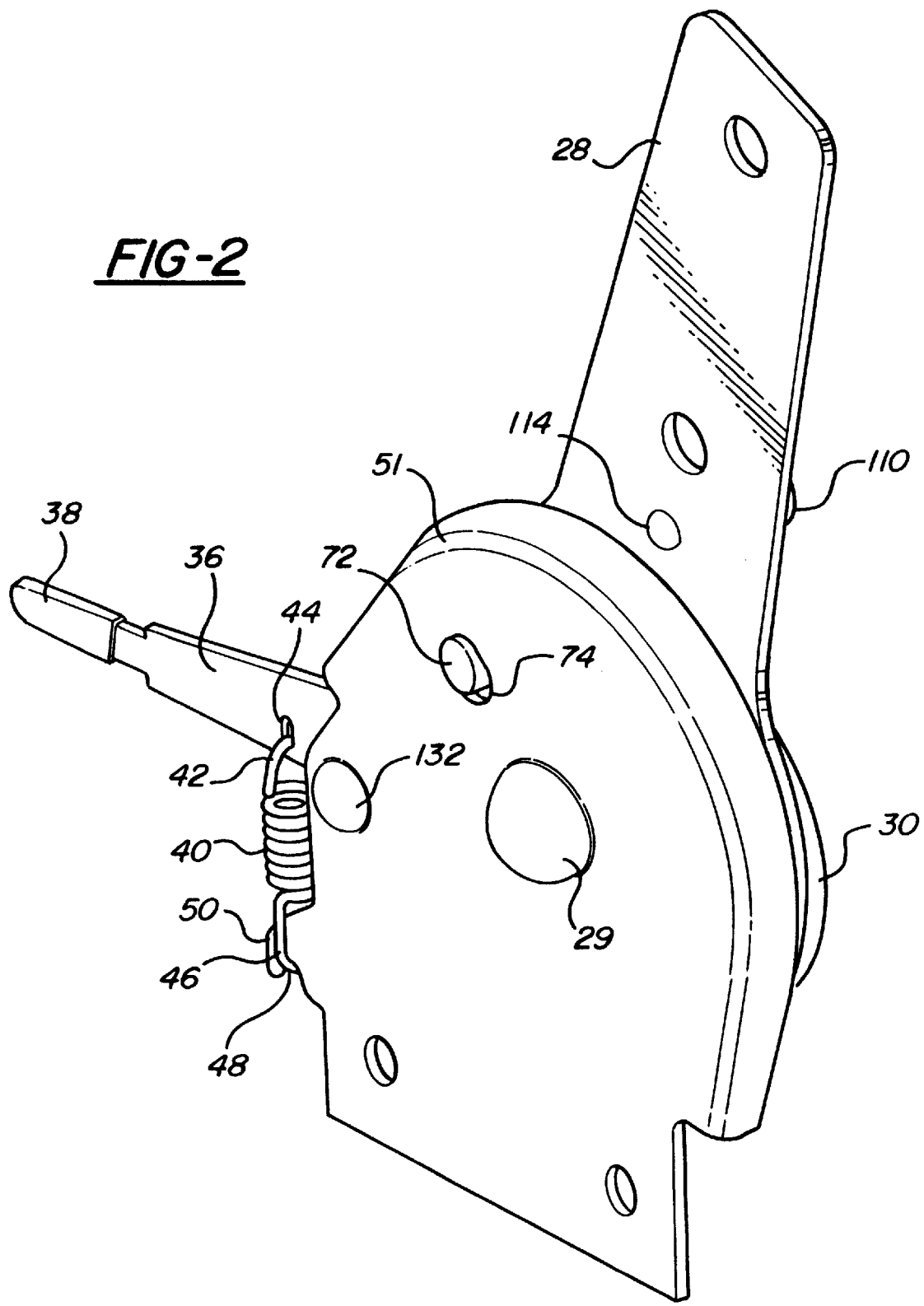
FIG. 2 of the drawings is a perspective view of the right side of the recliner assembly.
Figure 3:
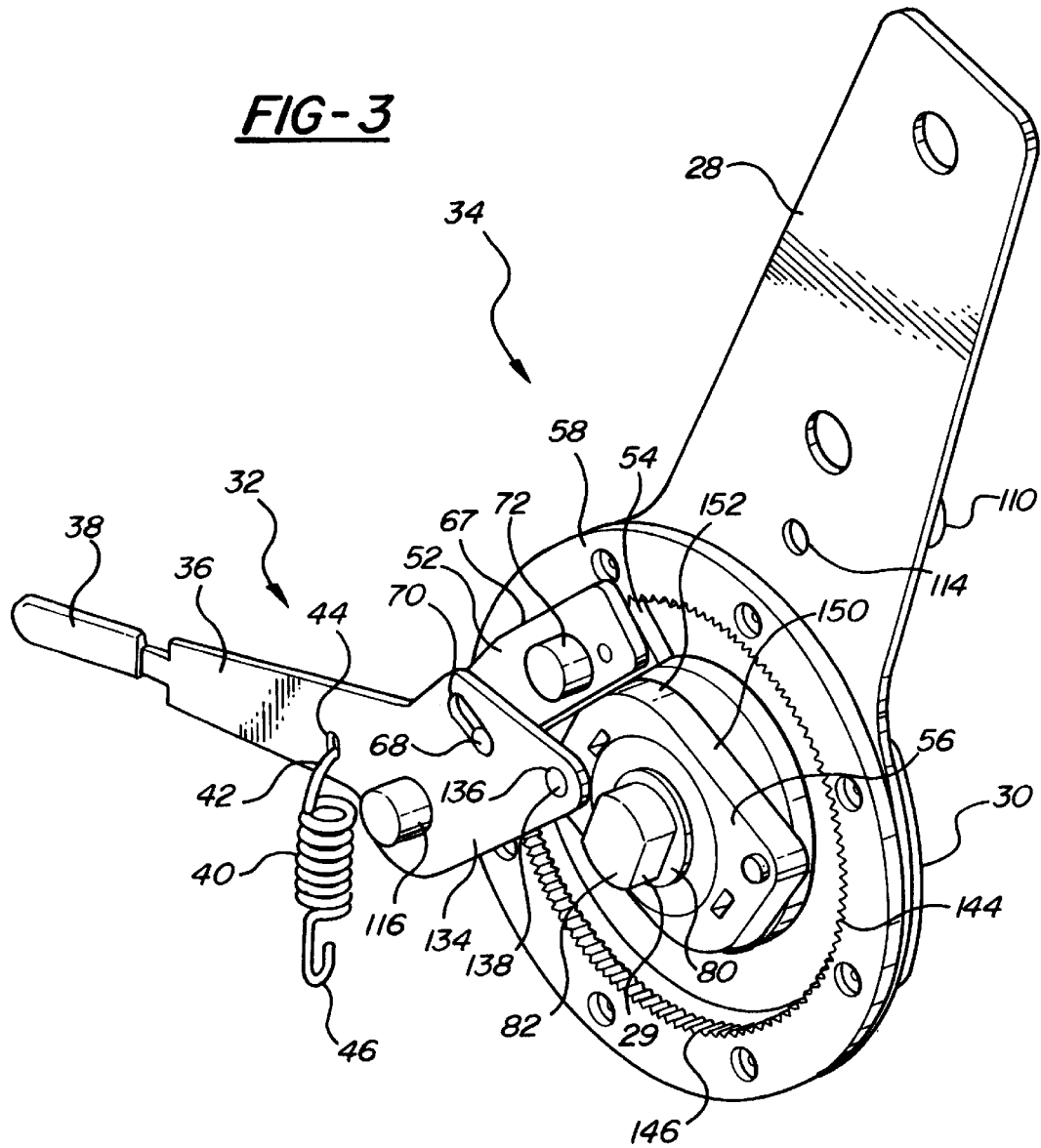
FIG. 3 of the drawings is a perspective view of the right side of the recliner assembly with a proximal side cover removed to reveal the operating components.
Figure 4:
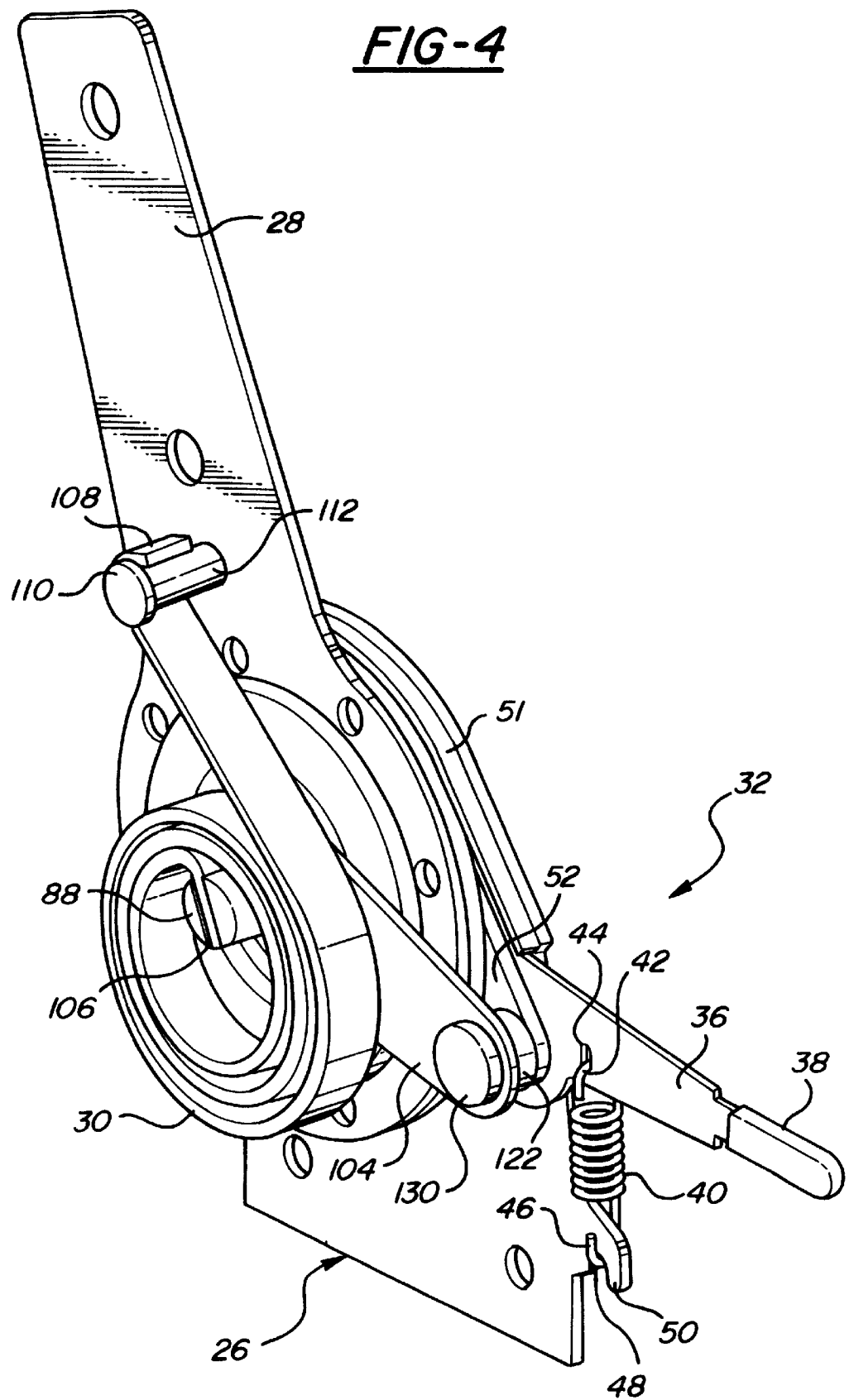
FIG. 4 of the drawings is a perspective view of the left side of the recliner assembly.

Referring now more particularly to the drawings, there is shown in FIG. 1 thereof a vehicle seat assembly, generally indicated at 10, embodying the principles of the present invention. The seat assembly 10 includes a seat cushion assembly 12 which includes a structure, constructed and arranged to suitably mount the seat assembly in any conventional fashion on the vehicle floor, schematically illustrated at 14 in FIG. 1. As shown, a set of track assemblies 16 serves to mount the seat cushion assembly 12 on the vehicle floor 14 for fore and aft adjusting movements.

The seat assembly 10 also includes a seat back assembly 18 which is mounted on the seat cushion assembly 12 by a recliner assembly, generally indicated at 20, which is constructed in accordance with the principles of the present invention.

During the normal use of the seat, the recliner assembly 20 is in its locked, inoperative, position so that the seat back assembly 18 is retained in a specific reclining position within the range of reclining positions provided.

When a user seated on the seat cushion assembly 12 desires to adjust the reclining position of the seat back assembly 18 within the range of positions provided, the user moves the recliner assembly 20 from its locking position into its unlocked, disengaged, position. This enables the seat back assembly 18 to be moved into the desired position within the range of positions provided. Forward pivotal movement of the seat back assembly 18 through the range of positions is then accomplished by the user leaning forward with his back to the rear seat back assembly 18. Rearward pivotal motion of the seat back assembly 18 through the range of positions provided is accomplished by the user leaning back and moving the seat back assembly 18. Once the desired new reclining position is obtained, the user simply allows the recliner assembly 20 to be returned from its disengaged, unlocked, position into its locking position.

Figure 5A:
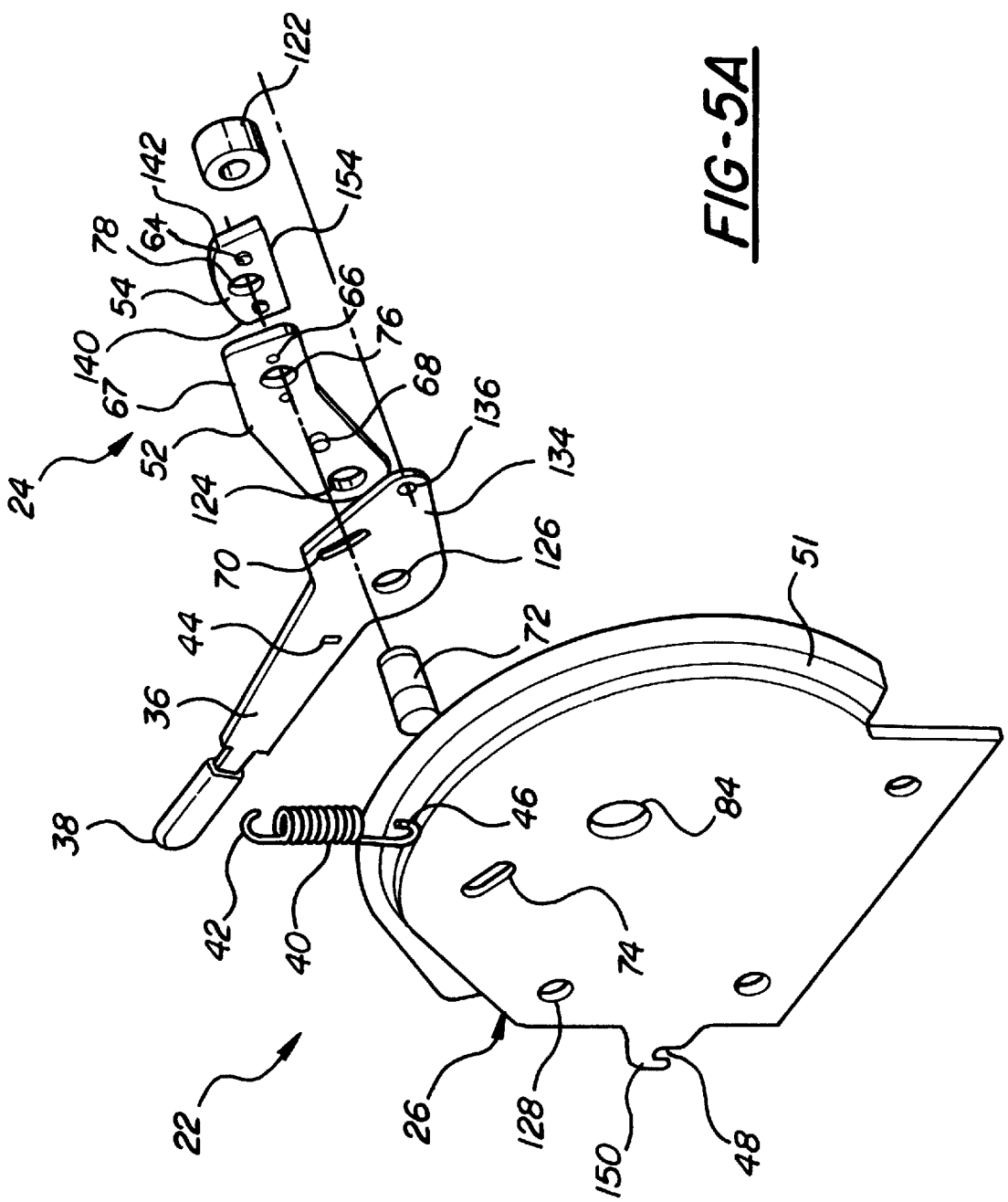
FIG. 5A of the drawings is an exploded view of the seat recliner assembly of FIG. 1.
Figure 5B:
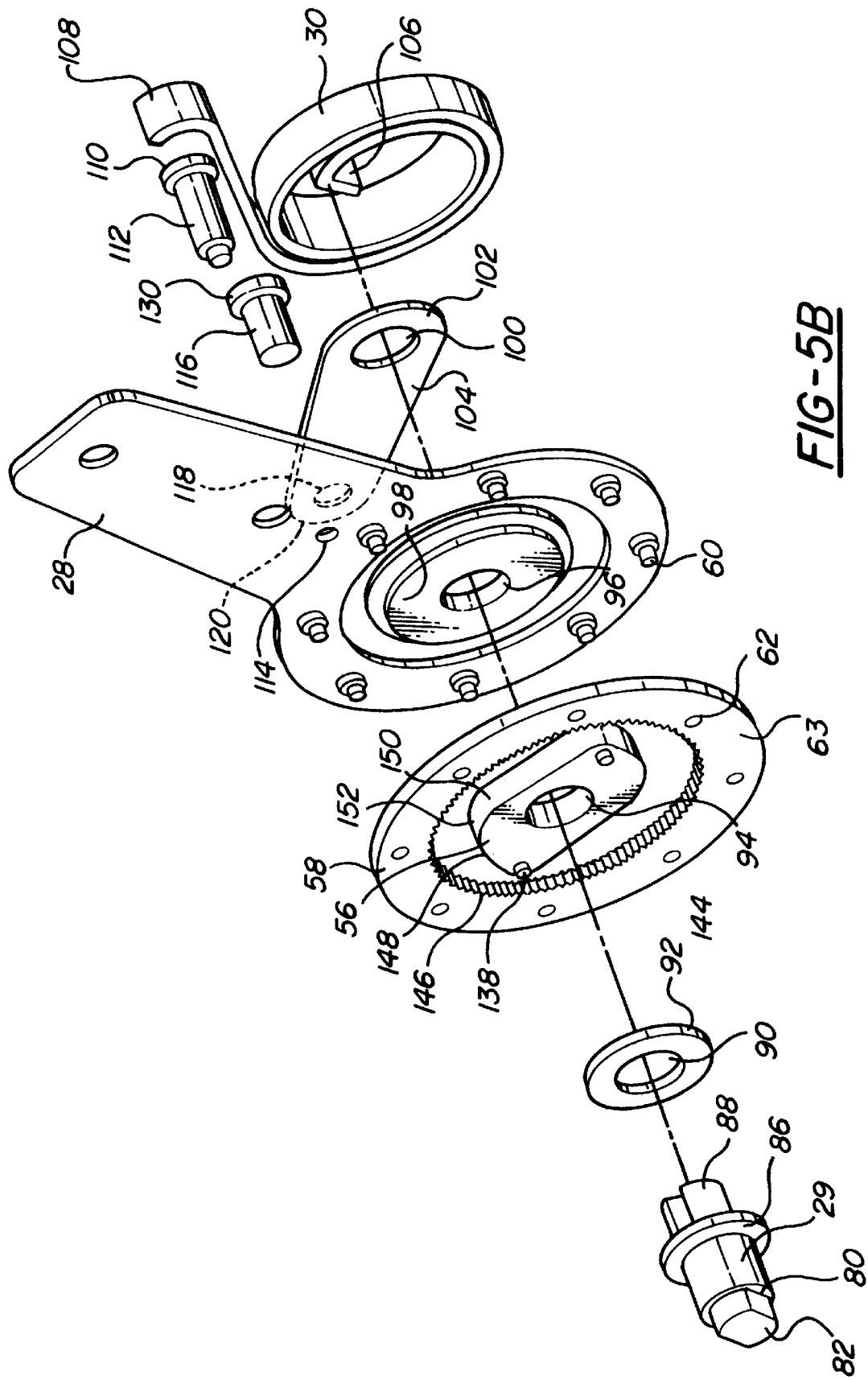
FIG. 5B of the drawings is a continuation of the exploded view of the seat recliner assembly of FIG. 1.
Figure 6:
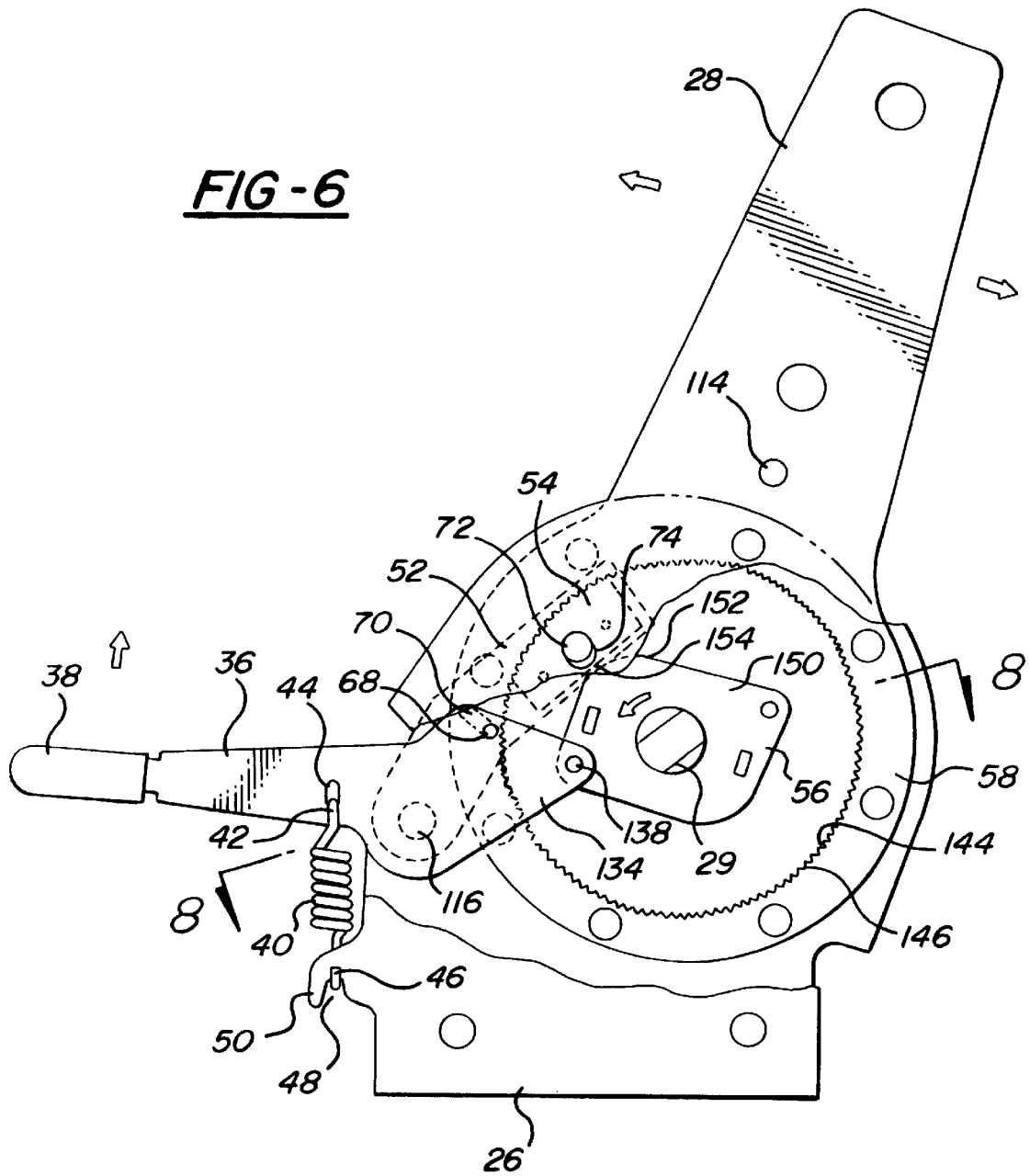
FIG. 6 of the drawings is an elevated right side view of the recliner assembly in the locked position.
Figure 7:
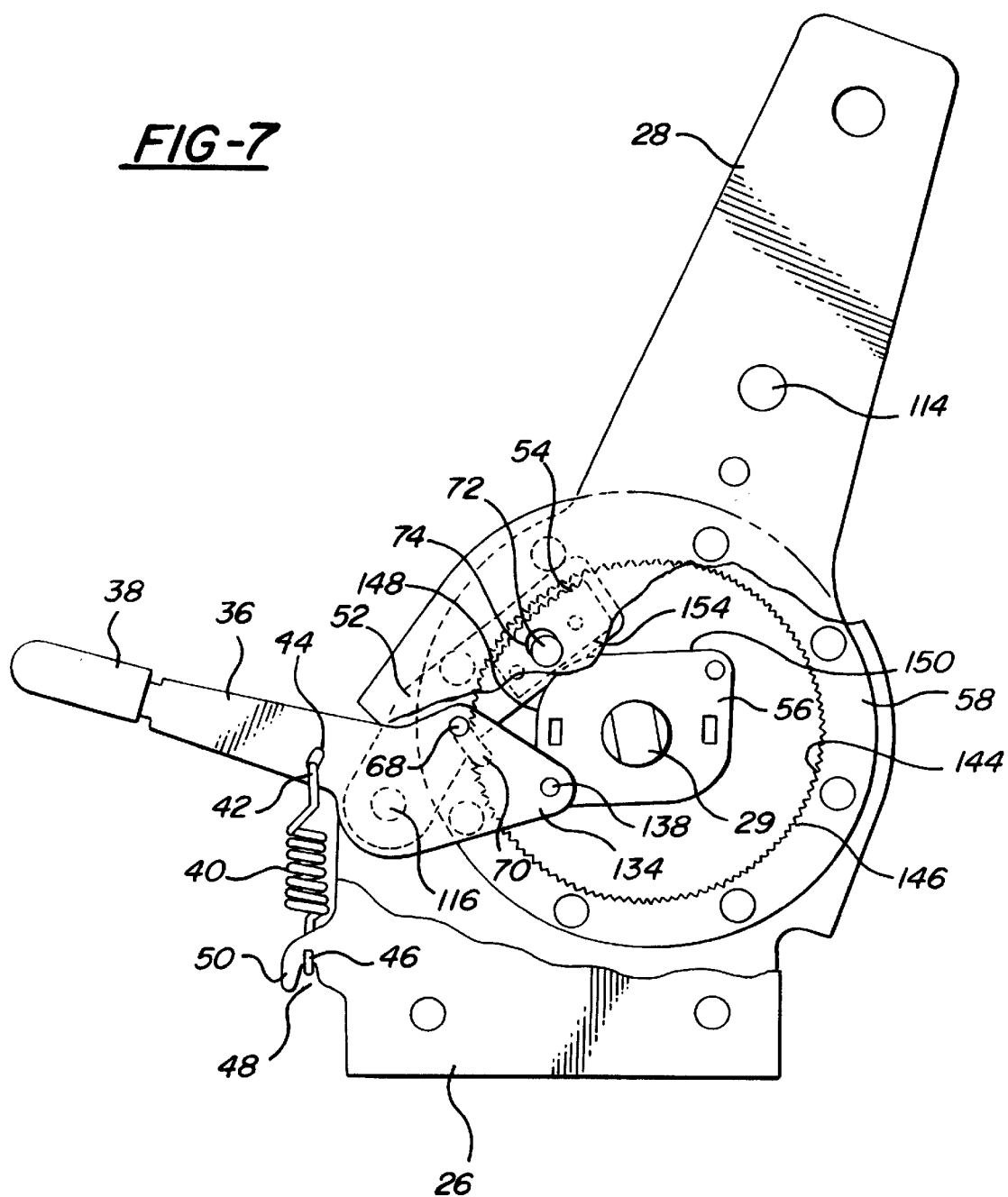
FIG. 7 of the drawings is an elevated right side view of the recliner assembly in the unlocked and disengaged position.
Figure 8:
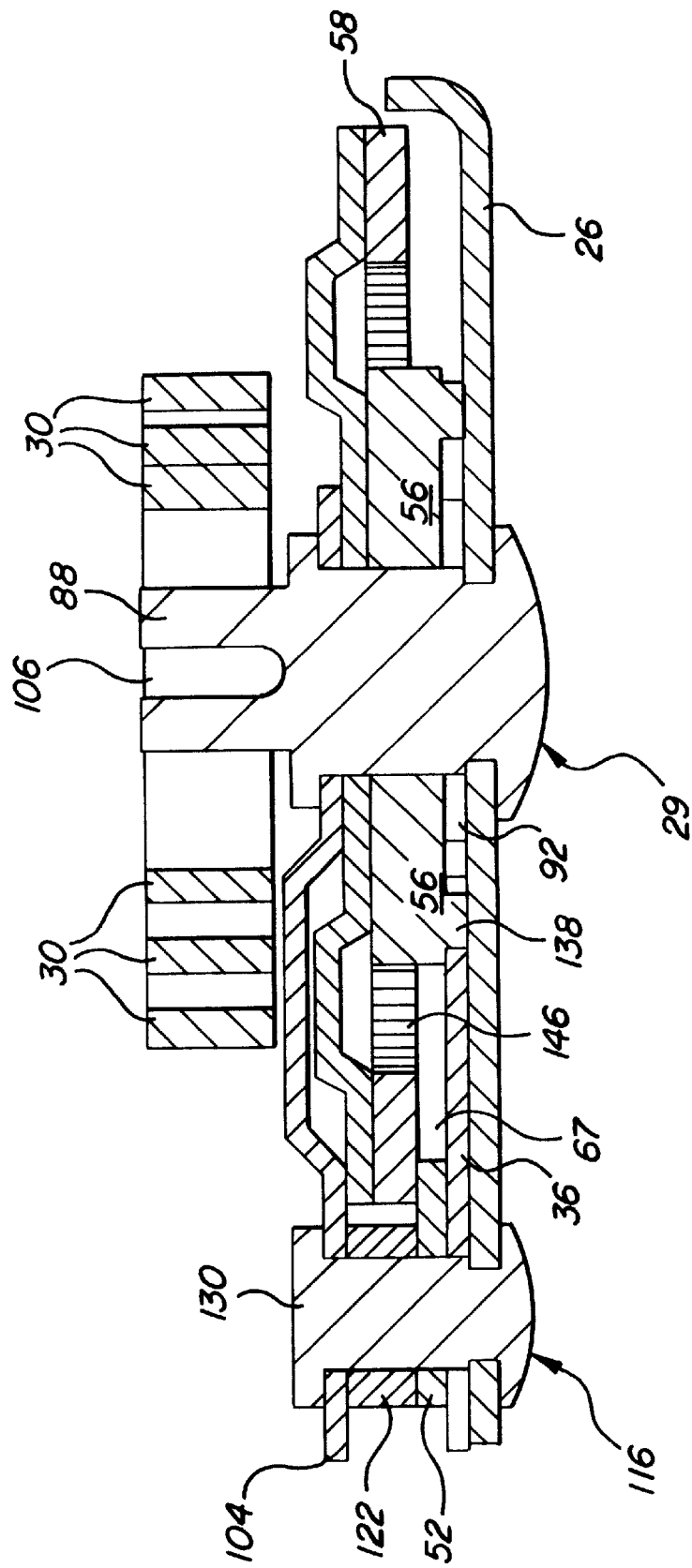
FIG. 8 of the drawings is a cross-sectional view taken along line 8—8 of FIG. 6.

As shown in FIGS. 5A and 5B the seat recliner assembly 20 comprises two main portions; namely, a support structure, generally indicated at 22, and a manually releasable locking mechanism, generally indicated at 24. The support structure 22 consists of a fixed base member 26, a movable seat back arm member 28, a stationary pivot pin 29, and an elastic coil spring element 30. The lower portion of the base member 26 is attached to the lower portion of the seat cushion assembly 12 by a pair of suitable bolt-like attaching elements 31 to form a stable base for the seat back arm member 28 and the manually releasable locking mechanism 24. An appropriately similar supporting structure is affixed to the opposite end of the seat cushion assembly 12 to support the opposite end of the seat back assembly 18.

The seat back arm member 28 moves about the stationary pivot pin 29 and keeps the recliner assembly 20 components in place and properly aligned. The pivot pin 29 interacts with the elastic coil spring element 30 to effect pivotal movement of the seat back assembly in both the forwardly (dump) direction and the rearwardly, reclining, direction when operated by the user.

The manually releasable locking mechanism 24 consists of a seat back release mechanism, generally indicated at 32, and a locking mechanism, generally indicated at 34. The seat back release mechanism 32 consists of a release member 36 with a handle element 38, and an elastic spring bias element 40, and functions to initiate unlocking the locking mechanism 34. A hooked upper end 42 of the elastic spring element 40 connects to an oblong aperture 44 near the midportion of the release member 36 to properly position the release member 36.

The other end of the elastic spring element 40, a hooked lower end 46, attaches to a notch 48 in an outwardly extending, hook-shaped downward nub 50 on the fixed based member 26. With the elastic spring element 40 anchored to the fixed base member 26, the release member 36 is pre-tensioned to prevent accidentally unlocking the seat back arm member 28.

The fixed base member 26 contains a protective lip 51 that covers and protects portions of the release member 36 and the manually releasable locking mechanism 24.

The locking mechanism 34 consists of a pawl arm member 52, an engagement pawl member 54, a rectangular-like locking control cam member 56, and an engagement ring member 58. Movement of the pawl arm member 52, the engagement pawl member 54, and the locking control cam member 56 are initiated and controlled through operation of the release member 36. The engagement ring member 58 is secured to the seat back arm member 28 by a series of eight equally-spaced attachment pin elements 60 on the seat back arm member 28 that match up with, and press-fit into, a series of eight equally-spaced circular apertures 62 around a flat circular surface 63 on the engagement ring member 58. The engagement ring member 58 functions as an integral part of the movable seat back arm member 28.

The components of the recliner assembly 20 locking mechanism 34 move between two basic positions-locked and unlocked, with both positions being directly reflective of movement of the seat back assembly. The locking mechanism 34 acts as a pivotal support structure.

The engagement pawl member 54 is attached to the pawl arm member 52 by a pair of circular alignment pins 64 that press fit into a corresponding pair of circular openings 66 in the pawl arm member 52. The pawl arm member 52 is attached to the engagement pawl member 54 at an angled upper extension 67 portion of the pawl arm 52. Thus, the engagement pawl arm member 54 always moves in unison with any movement of the pawl arm member 52. The pawl arm member 54 shares a common pivot point with the release member 36.

A handle movement drive pin 68 on the pawl arm member 52 connects the pawl arm member 52 and the attached engagement pawl member 54 to the release member 36 through an elongated slot 70 in the release member 36. This pin and slot connection provides the link through which movement of the handle element 38 controls operation of the locking mechanism 34.

A pawl movement limit pin 72 links the pawl arm member 52 and the attached engagement pawl member 54 with the fixed base member 26 through an arcuate slot 74 on the base member 26. The limit pin 72 passes through circular apertures 76 and 78 in the pawl arm member 52 and the attached engagement pawl member 54, respectively, and, due to the length of the elongated slot 74, limits pivotal movement of the pawl member 54 between the locked (filly engaged) position and the unlocked (completely separated and disengaged) position of the locking mechanism 34.

When the recliner assembly 20 is locked, forces applied to pivot the seat back assembly 18 are transmitted to the movable seat back arm member 28. The forces are then transferred through the engagement ring member 58 attached to the seat back arm member 28, to the engagement pawl member 54. These forces are then effectively transferred to, and through, the pawl member limit pin 72 in the arcuate slot 74, linking the pawl member 54 to the fixed base member 26. With the recliner assembly 20 locked, the limit pin 72 in the arcuate slot 74 is forced against the fixed base member 26.

When the recliner assembly 20 is unlocked and disengaged, forces applied to pivot the seat back assembly 18 are transmitted to the movable seat back arm member 28 which is not free to move under the influence of these forces. In this situation, the forces are not transferred beyond the seat back arm member 28 which is now completely free from engagement with other portions of the recliner assembly 20. There are no forces transferred to the pawl member limit pin 72 in the arcuate slot 74 linking the pawl member 54 to the fixed base member 26. With the recliner assembly 20 unlocked, the position of the limit pin 72 in the arcuate slot 74 may vary, but the actual position of the pin 72 has no effect upon the operation of the recliner assembly 20. Thus, no pivotal forces are transferred from the seat back assembly 18 to the fixed base member 26 through the position of the limit pin 72 when the recliner assembly is unlocked. Thus, the relative position of the limit pin 72 in the arcuate slot 74 has no relevance to the operation when the recliner assembly 20 is unlocked and disengaged.

The stationary pivot pin 29 passes axially through the recliner assembly 20, securing the components in place and maintaining proper alignment. An outer lip surface 80 of the stationary pin 29 fits the pin 29 properly against the fixed based member 26 when the recliner is assembled. A positioning key element 82 on the outwardly facing end of the stationary pin 29 fits into a key aperture 84 in the fixed base member 26 to prevent the stationary pin 29 from moving radially. The stationary pin 29 also performs a spacing function that allows a circular spacing protrusion 86 on the stationary pin 29 to maintain proper alignment of the locking control cam member 56 within the manually releasable locking mechanism 24.

The other end of the stationary pin 29 is a split extension element 88 that extends through a circular aperture 90 in a spacing washer member 92, through a circular aperture 94 in the cam member 56, through a circular mounting aperture 96 in a raised circular inner surface 98 in the seat back arm member 28, and through a circular aperture 100 in a large end 102 of a fixed cover member 104 that serves as a brace between two shafts. The split extension element 88 engages a sharply angled inner end 106 of the elastic spring element 30. The elastic spring element 30 is coiled around the split extension element 88, and a curved end 108 of the spring element 30 is retained by a circular end lip 110 on a cylindrical retainer 112 attached to the seat back arm member 28. The cylindrical retainer 112 is press-fit into an opening 114 in the seat back arm member 28. The coiled spring 30 is under constant tension thus maintaining a forward bias on the seat back arm member 28. When the seat back release member 36 is moved upwardly the recliner assembly 20 is unlocked and becomes disengaged. The torque inherent in the resilience of the spring element 30 then tends to force the seat back assembly 18 to pivot forwardly to the dump position.

The release member 36 pivots about a pivot pin 116 that first passes through a circular aperture 118 in a small end 120 of the cover member 104, then through a spacing member 122, through a circular aperture 124 in the pawl arm member 52, and then through a circular aperture 126 in the handle member 36. The pivot pin 116 seats in a circular aperture 128 in the fixed base member 26. The release member 36 is properly aligned and held in place by a cylindrical end protrusion 130 on the end of the pivot pin 116 nearest the cover member 30, and by a wedged end surface 132 on the portion of the pivot pin 116 seated in the aperture 128 in the base member 26.

A front portion 134 of the release member 36 contains a circular opening 136 that engages a movement control pin 138 on the locking control cam member 56. Movement of the control pin 138 causes the cam member 56 to pivot about the stationary pin 80 and control operation of the locking mechanism 34.

The engagement pawl member 54 contains a arcuate upper toothed surface 140 with equally spaced engagement teeth 142 comprising the entire surface. The curved upper toothed surface 140 interfaces with a toothed inner circumferential surface 144 on the engagement ring member 58 and the engagement teeth 142 on the pawl member 54 mesh completely with a series of equally spaced engagement teeth 146 comprising the entire 360-degree inner circumferential surface 144 of the engagement ring member 58 when the recliner assembly 20 is locked.

The rectangular-like cam member 56 contains a pair of diametrically opposed short end surfaces 148 and a pair of diametrically opposed long end surfaces 150, separated by a pair of curved camming surfaces 152. One of the cam member surfaces, 148, 150, or 152, is always in contact with a flat bottom surface 154 of the engagement pawl member 54.

The recliner assembly 20 operates through controlled by movement of the cam member 56 which causes the pawl member 54 engagement teeth 142 to either mesh with or separate completely from the engagement teeth 146 on the inner circumference 144 of the engagement ring member 58. The position of the cam member 56 is controlled in turn by the movement and position of the handle element 38. With the recliner assembly 20 in the inoperative position, the seat back arm member 28 is locked in place, thus locking the seat cushion assembly 12 in place. Under these conditions, the short end surface 148 of the cam member 56 is forced against the flat bottom surface 154 of the engagement pawl member 54 by the position of the release member 36 and the subsequent corresponding position of the angled upper extension 67 of the pawl arm member 52. This forces the pawl member engagement teeth 142 to mesh completely with the engagement teeth 146 on the inner circumferential surface 144 of the engagement ring member 54.

When the handle element 38 moves upward, the release member 36 pivots clockwise about the pivot pin 116 which, in-turn, causes the cam movement control pin 138 and, consequently the cam member 56, to pivot downward slightly in a counter-clockwise direction. As the handle element 38 continues to move upward, the slot 70 in the front portion 134 of the release member 36 engages the drive pin 68 on the pawl arm member 52 that in turn forces the pawl arm member 52 to also begin to pivot clockwise about the pivot pin 116. The shape of the angled upper extension 67 allows pivotal forces about the pivot pin 116 to be transferred directly to the engagement pawl member 54 through the drive pin 68.

As the pawl arm member 52 and the engagement pawl member 54 begin to pivot in a clockwise direction, the pawl arm member 52 is forced downward and away from contact with the engagement ring member 58, which in turn forces the engagement teeth 142 on the pawl member 54 away from the engagement teeth 146 on the inner circumference 144 of the engagement ring member 58.

At this time the cam member 56 has pivoted to where the short end surface 148 is no longer contacting the flat bottom surface 154 of the engagement pawl member 54. The curved camming surface 152 is now in contact with the flat bottom surface 154. This, in turn, unlocks the locking mechanism 34 and separates the engagement teeth 142 on the pawl member 54 from the engagement teeth 146 on the inner circumference 144 of the ring member 58. Thus, it is shown that the force required to unlock and disengage the manually releasable locking mechanism 24 is pivotally transferred from movement of the release member 36 directly to both the cam member 56 and to the engagement pawl member 54.

Because the ring member 58 is attached to the seat back arm member 28, when the engagement teeth 142 and 146 are completely separated, the seat back arm member 28 is disengaged and can move about the stationary pin 80. The engagement teeth 142 of the pawl member 54 will remain disengaged from the teeth 146 on the engagement ring member 58 as long as the handle element 38 is raised upwardly. Keeping the handle element 38 raised upwardly keeps the pawl arm 52 oriented in a position where the flat bottom surface 154 of the engagement pawl member 52 is being supported by the curved surface 152 of the cam member 56.

When the handle element 38 is released, the torque of the elastic spring element 40 forces the pawl arm 52 and the attached pawl member 54 towards the engagement ring member 58 to once again mesh the engagement teeth 142 on the pawl member surface with the teeth 146 on the inner circumference 144 of the engagement ring member 58. Whenever the handle element 38 is released, the engagement teeth 142 and 146 on the pawl member and on the engagement ring member 58 will mesh and lock the seat back assembly 18 in position.

It can be seen that, during the normal use of the seat, the elastic spring element 40 serves to bias the release member 36 into its locked position so that the seat back assembly 18 is retained in a specific reclining position within the range of reclining positions provided.

When a user seated on the seat cushion assembly 12 desires to adjust the reclining position of the seat back assembly 18 within the range of positions provided, the user simply reaches down and grasps the handle element 38 and moves it upwardly from its locking position into its releasing position. This releases the locking mechanism 24 enabling the seat back assembly 18 to be moved into the desired position within the range of positions provided.

As the handle element 38 pivot point and the engagement pawl member 54 pivot point are the same, it is seen that the pivot pin 116 is the common tie to all of the recliner operations.

Forward pivotal movement of the seat back assembly 18 through the range of positions is accomplished by the elastic coil spring element 30 under the control of the user leaning forward with his back to the rear seat back assembly 18. Rearward pivotal motion of the seat back cushion assembly 18 through the range of positions provided is accomplished by the user leaning back and moving the seat back assembly 18 against the bias of the elastic coil spring element 30. Once the desired new reclining position is obtained, the user simply releases the handle element 38, allowing the handle element 38 to be returned from its releasing position into its locking position by the bias of the elastic coil spring element 30, thus moving the releasable locking mechanism 24 from its releasing position into its locking position.

When the handle element 38 is released, the residual force of the elastic spring element 40 will cause the handle to move downwardly. As the handle element 38 moves downwardly, it reverses the process previously described. The release member 36 will pivot in the counterclockwise direction about the pivot pin 116 causing the cam member 56 to pivot in the clockwise position which in turn forces the pawl member 52 up into the engaged position where the engagement teeth 142 on the pawl member are completely meshed with the teeth 146 on the inner circumference 144 of the engagement ring member 58. When the teeth 142 on the pawl member 54 completely mesh with the teeth 146 on the engagement ring member 58 the seat back arm cushion assembly 18 is locked in place.

Because the present subject matter utilizes a single pivot point for both the handle release member and the engagement pawl member, and a direct transfer of pivotal forces between the seat back assembly 18 and the fixed base member 26 is accomplished through the engagement of the pin 72 with the portion of the base member 26 defining the arcuate slot 74 when the recliner assembly is locked in position, the number of components in the devised is minimized which in turn adds to the reliability of the seat reclining mechanism and of the seat assembly itself. In the embodiment shown, the shape of the slot 74 is such that the pin 72 stays in engagement with the wall defining the slot 74 when the pawl member 52 is moved to its release position. It will be understood that the slot 74 could be configured to enable the pin to disengage from the wall defining the slot 74 so long as force transmitting engagement occurs when the pin reaches the operative position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced other than as specifically described.

What is claimed is:

1. A recliner assembly comprising:
a fixed plate;
a seat back arm member pivotally secured to said fixed plate for pivotal movement between a plurality of reclined positions;
a locking mechanism for selectively engaging said seat back arm member between a locked position and an unlocked position, said locking mechanism including a pawl member moveable between said locked position engaging said seat back arm member and said unlocked position spaced from said seat back arm member and a looking control arm rotatably coupled between said seat back arm member and said fixed plate and operatively engageable with said pawl member between a first position forcing and retaining said pawl member in said locked position and a second position camming against said pawl member in said locked position;
a seat back release member pivotally coupled to said fixed plate and connected to said locking control arm for rotating said control arm between said first and second positions; and
said seat back release member connected to said pawl member and simultaneously pivoting said pawl member between said locked and unlocked positions while rotating said locking control arm between said first and second positions.

2. A recliner assembly as set forth in claim 1 further including a stationary pivot pin pivotally connecting said seat back release member and said pawl member to said fixed plate.

3. A recliner assembly as set forth in claim 2 further including a control pin interconnecting said release member and said locking control arm to rotate said control arm in response to pivotal movement of said release member about said pivot pin.

4. A recliner assembly as set forth in claim 3 further including a handle drive pin operatively connecting said release member and said pawl member for pivoting said pawl member in response to pivotal movement of said release member about said pivot pin.

5. A recliner assembly as set forth in claim 4 wherein said release member includes an arcuate slot for receiving said handle drive pin to provide lost motion between said rotation of said control arm member and said pivotal movement of said pawl member.

6. A recliner assembly as set forth in claim 5 wherein said pawl member includes a pawl arm member coupled to said release member and having an angled upper extension secured to an engagement pawl member, said engagement pawl member being seated between said seat back arm member and said locking control arm in said locked and unlocked positions.

7. A recliner assembly as set forth in claim 6 wherein said engagement pawl member includes a bottom surface and said control arm member includes an end surface for engaging said bottom surface and forcing said pawl member in said locked position against said seat back arm member.

8. A recliner assembly as set forth in claim 7 further including a spring bias element interconnecting said seat back release mechanism and said fixed plate for urging said locking mechanism to said locked position.

9. A recliner assembly as set forth in claim 8 further including a pawl movement limit pin operatively coupled between said pawl member and said fixed plate for limiting said pivotal movement of said pawl member between said locked and unlocked positions.

10. A recliner assembly as set forth in claim 9 wherein said engagement pawl member includes an outer toothed surface and said seat back arm member includes an engagement ring member having an inner toothed surface for intermeshing locking engagement with said toothed surface of said pawl member in said locked position.

* * * * *